United States Patent [19]
Fedorovich

[11] Patent Number: 6,142,479
[45] Date of Patent: Nov. 7, 2000

[54] SPLIT LABYRINTH SEAL

[75] Inventor: George Fedorovich, Nacogdoches, Tex.

[73] Assignee: JM Clipper Corporation, Nacogdoches, Tex.

[21] Appl. No.: 09/172,257

[22] Filed: Oct. 14, 1998

[51] Int. Cl.⁷ ................................................ F16J 15/447
[52] U.S. Cl. ............................................................ 277/412
[58] Field of Search .................................. 277/399, 303, 277/411, 412

[56] References Cited

U.S. PATENT DOCUMENTS

| | | |
|---|---|---|
| 2,141,102 | 12/1938 | Brooke . |
| 2,229,963 | 1/1941 | Dickinson . |
| 3,155,395 | 11/1964 | Hoffman . |
| 3,920,251 | 11/1975 | Remberg . |
| 4,170,364 | 10/1979 | Remberg et al. . |
| 4,375,292 | 3/1983 | Ericson . |
| 4,436,311 | 3/1984 | Brandon . |
| 4,500,096 | 2/1985 | Tuttle et al. . |
| 4,575,098 | 3/1986 | Escue . |
| 4,576,384 | 3/1986 | Azibert . |
| 4,685,684 | 8/1987 | Ballard . |
| 4,836,561 | 6/1989 | Lebeck et al. . |
| 4,863,177 | 9/1989 | Rockwood et al. . |
| 5,143,384 | 9/1992 | Lipschitz . |
| 5,188,377 | 2/1993 | Drumm . |
| 5,316,317 | 5/1994 | Fedorovich et al. . |
| 5,362,072 | 11/1994 | Dalton . |
| 5,395,124 | 3/1995 | Brandon . |
| 5,464,226 | 11/1995 | Dalton . |
| 5,501,573 | 3/1996 | Sanders . |
| 5,735,530 | 4/1998 | Merkin et al. ........................ 277/412 |
| 5,908,195 | 6/1999 | Sharrer . |

Primary Examiner—Anthony Knight
Assistant Examiner—Karlena D Schwing
Attorney, Agent, or Firm—Dickstein Shapiro Morin & Oshonsky LLP

[57] ABSTRACT

A two-piece labyrinth seal adapted to be easily and quickly mounted upon a shaft within a housing to minimize downtime of the equipment. The seal is formed of a rotor and a stator. The rotor and the stator are each formed of two relatively equal portions. The rotor portions and the stator portions each mate at an interface. The interface is generally along an axial plane and crosses the plane at least twice within the rotor and within the stator. The rotor is interlocked with the stator. The rotor and stator portions are mechanically connected.

33 Claims, 5 Drawing Sheets

SPLIT LABYRINTH SEAL

FIELD OF THE INVENTION

The present invention relates to a device for providing a static and a dynamic seal between a rotatable shaft and a housing. In particular, the present invention relates to a labyrinth seal which includes a rotor and a stator portion, both of which are axially split.

BACKGROUND OF THE INVENTION

Prior art devices for sealing a rotating shaft are disclosed in U.S. Pat. Nos. 4,022,479 (Orlowski) and 5,024,451 (Borowski). Seal devices of this type may be used to inhibit oil from escaping out of a bearing housing and/or to inhibit contaminants from working their way into the housing. The prior art devices are formed of at least two ring-shaped members that rotate with respect to each other when the shaft is rotated. One of the members is fixed to the housing and does not rotate. The other member rotates with the rotating shaft.

The two ring members should be located very close together, particularly when the seal device is used to isolate the bearing from small particulate contaminants. Even small quantities of such contaminants are capable of significantly deteriorating the bearing. To prevent such contamination, the two relatively rotatable ring members must be held together very closely, with only a very narrow space therebetween.

The ring members of the Orlowski seal device are connected together by a separate securing apparatus, not shown in the prior art patent. The ring members themselves have no structure for establishing and maintaining a narrow spacing therebetween. Therefore, the prior art seal device cannot be manufactured as a unit with a preset, fixed spacing. The spacing between the ring members has to be set when the seal device is installed into the housing. This leaves room for human error outside the control of the device manufacturer. In particular, the Orlowski device can be improperly installed, with the ring members located too far apart to perform satisfactorily. Another problem with the Orlowski device is that the ring members may be separated subsequent to installation, for example by high pressure cleaning spray.

The ring members of the Borowski device are held together by a bead and a groove provided on the ring members themselves. The bead fits within the groove with an interference fit. This arrangement is an improvement over the Orlowski system in the sense that no separate securing apparatus is needed. But the Borowski device is still unsatisfactory because the bead must be resiliently deformed to be positioned within the groove, and the groove must be correspondingly enlarged to receive the deformed bead. The deformation of the bead during assembly makes it difficult to achieve the desired close positioning between the two ring members, as explained in more detail below.

Labyrinth seals may be used in applications which make it time consuming and difficult to either install the seal or to replace an existing seal. Further, labyrinth seals are sometimes used in applications in which it is not only time consuming to install a seal, but also in which the downtime of the equipment is costly. For example, in an aluminum mill, unplanned downtime to replace a labyrinth seal can be very expensive. It is, thus, desirable to utilize in such applications seals which are relatively easy to replace in a timely fashion.

Prior art devices showing split seals are disclosed in U.S. Pat. Nos. 4,863,177 (Rockwood et al.), 4,576,384 (Azibert), 4,575,098 (Escue), and 2,141,102 (Brooke). The device referred to in Rockwood et al. is a labyrinth seal having a split rotor and stator. The rotor halves integrally interlock together through a hook and protrusion arrangement, while the stator halves fit closely together as a mortis and tenon and are stable in relation to each due to the close fits. The device of Rockwood et al. has no rotor which interlocks with a stator.

The device referred to in Azibert is a split mechanical face seal having a rotary split seal ring assembly and a stationary split seal ring assembly. The seal ring assemblies are not arranged to create a labyrinth seal and they are not interlocked with each other.

The device referred to in Escue, like Azibert, is a split seal having a rotary seal means and a stationary seal means. The rotary seal means and a stationary seal means are split, but they are not arranged to create a labyrinth seal and they are not interlocked with each other.

The device referred to in Brooke is a labyrinth protective device including a stationary lug and a rotating mount which rotates on a ball or roller bearing. The device of Brooke, however, does not include a rotor mounted on a rotating shaft. Further, it has no mechanism for returning potentially harmful contaminants to the outside of the seal and has no mechanism for returning oil which has entered the seal back to the oil reservoir in the housing.

SUMMARY OF THE INVENTION

The disadvantages of the prior art are alleviated to a great extent by the present invention which provides a split labyrinth seal including a split rotor interlocked with a split stator.

In a preferred embodiment of the invention, a two-piece labyrinth seal includes a stator having two stator portions, and a rotor having two rotor portions. The rotor may be axially mounted and interlocked with the stator. The stator portions and the rotor portions cooperate to inhibit axial movement of the portions.

In one aspect of the invention, the interface between the stator and rotor portions crosses an axially directed plane twice in the stator and twice in the rotor.

In another aspect of the invention, the stator has a radially directed opening, a plurality of radially inwardly directed grooves and ridges, and an axially directed groove fluidly connected to the radially directed grooves.

In a further aspect of the invention, the stator has a flange, a radially inwardly directed groove and an axially directed groove with an opening therebetween.

In another aspect of the invention, the stator has a cover with a shoulder, and the shoulder and the interface between the portions provide proper axial positioning of the seal.

An object of the invention is to provide a two-piece labyrinth seal having a rotor with two rotor portions and a stator with two stator portions.

Another object of the present invention is to provide a seal device that can be easily installed (added or replaced)to reduce downtime of the equipment into which installation takes place.

The foregoing and other advantages and features of the invention will be more readily understood from the following detailed description of the invention, which is provided in connection with the accompanying drawings.

DETAILED DESCRIPTION OF PREFERRED EMBODIMENTS

Figure 1:
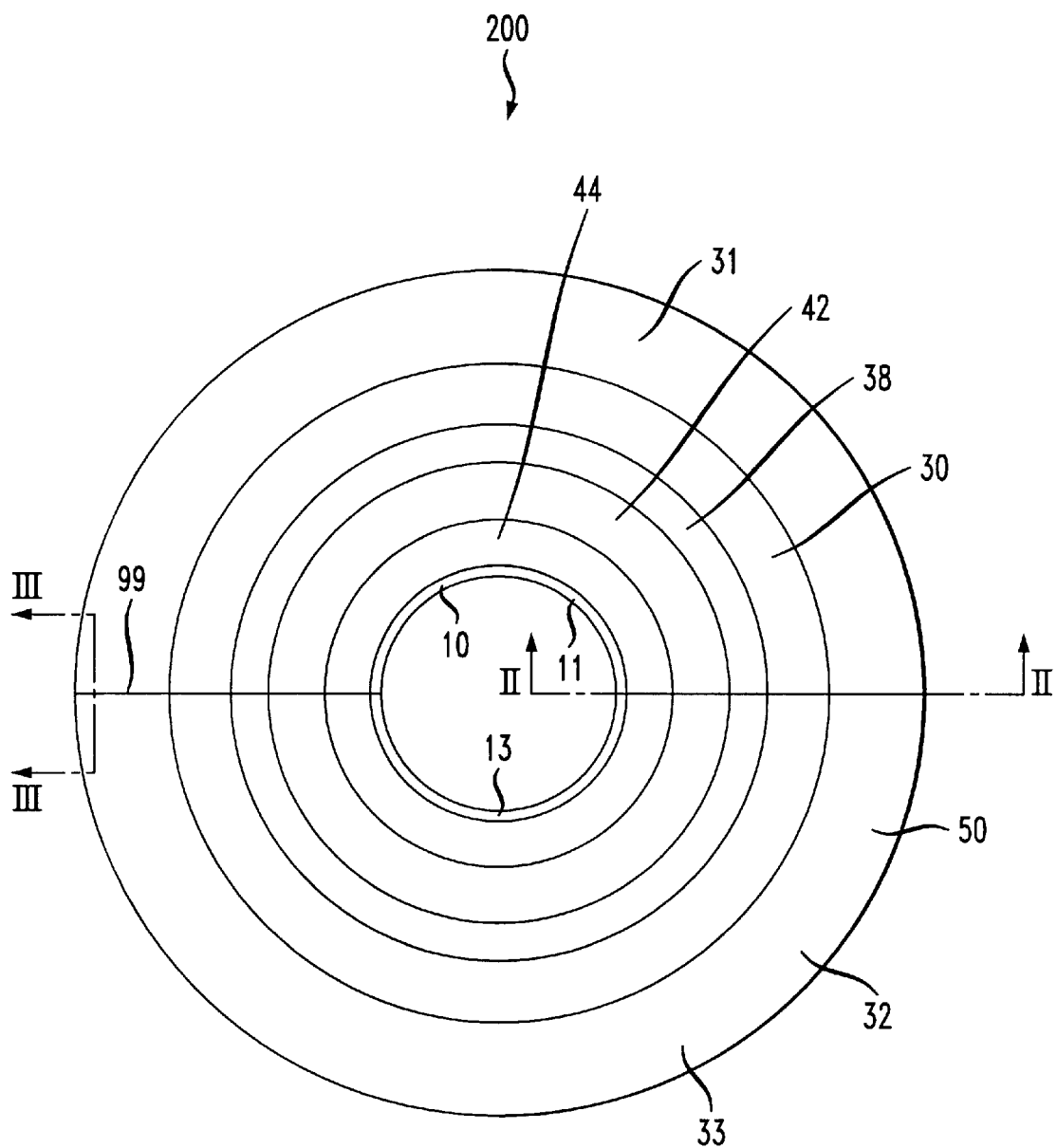
FIG. 1 is a front elevational view of a seal device constructed in accordance with a preferred embodiment of the present invention.
Figure 2:
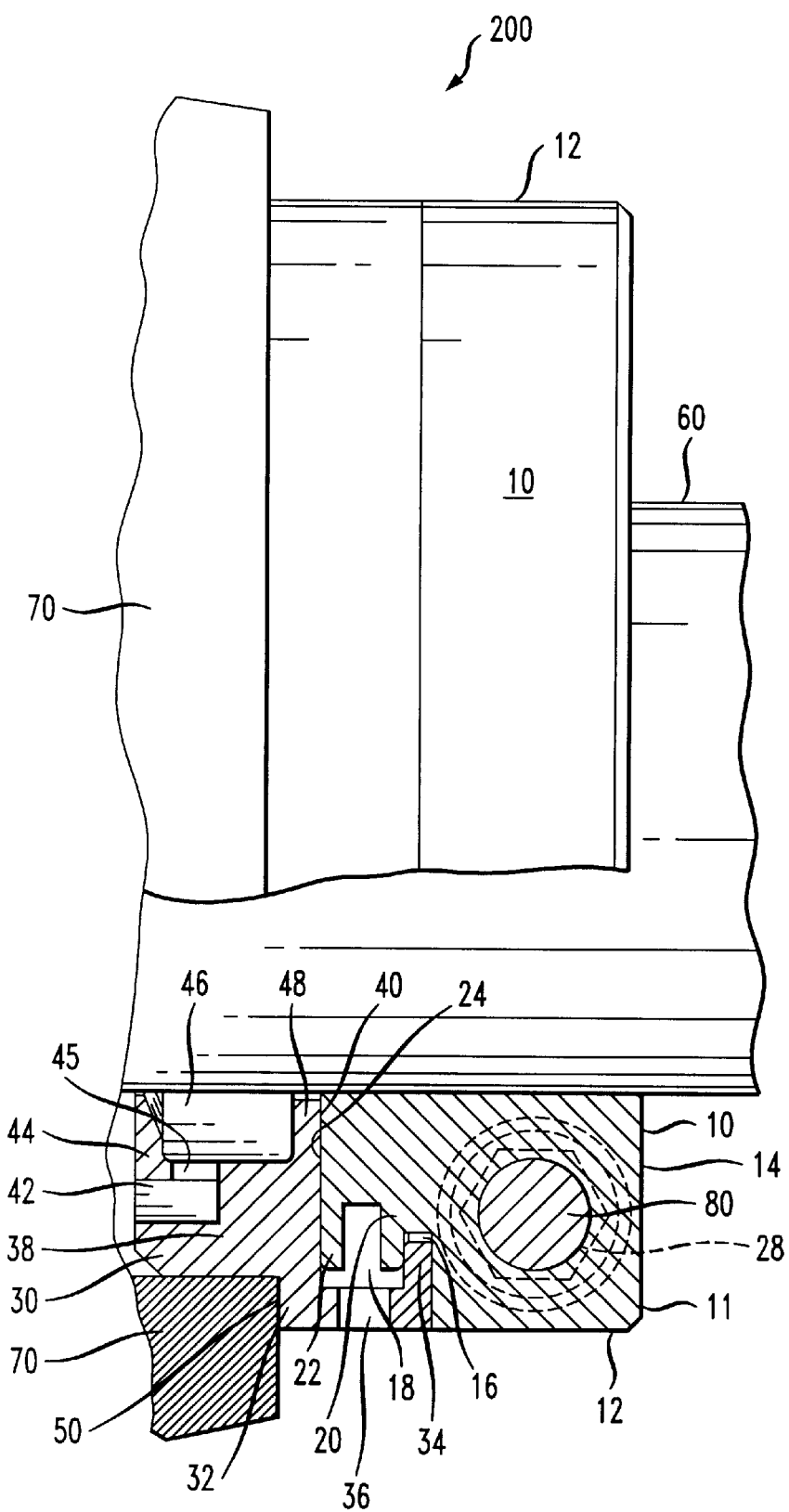
FIG. 2 is a partial cross sectional side view of the seal device of FIG. 1, taken along line II—II of FIG. 1, showing the seal device employed within a sealed system.
Figure 3:
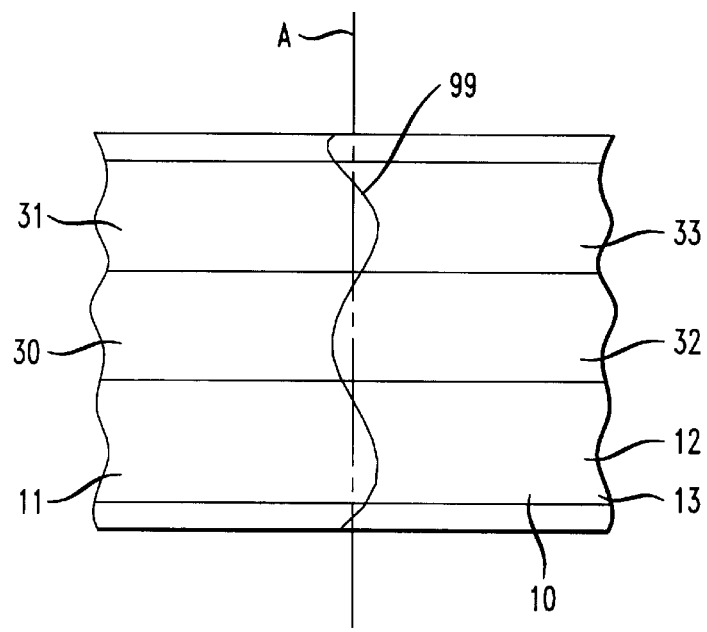
FIG. 3 is a partial side view of the seal device of FIG. 1, taken along line III—III of FIG. 1.

Referring now to FIGS. 1–3, a two-piece labyrinth seal 200 is shown having a rotor 10 and a stator 30. The rotor 10 is adapted to rotate with a rotating shaft 60. Specifically, the free inside diameter of the rotor 10 may be machined a few thousands of an inch smaller than the outside diameter of the shaft 60. Through assembly of the rotor 10 on the shaft 60 (described in greater detail below), the components of the rotor 10 will stretch together becoming tight on the rotatable shaft 60. Metals may not stretch as easily as plastics or polytetrafluoroethylene (PTFE), and therefore, a gasket or sealant is optional between sections of the seal 200 components.

Further, the rotor 10 is adapted so as to axially mount upon and interlock with the stator 30. The rotor 10 has an axially outwardly directed surface 14 and a radially outwardly surface 12. The rotor 10 further includes first and second grooves 16, 18 and first and second protrusions 20, 22. As shown in FIG. 2, the first protrusion 20 is positioned between the first groove 16 and the second groove 18. Further, the second groove 18 is positioned between the first protrusion 20 and the second protrusion 22. The rotor 10 further includes an axially inwardly directed surface 24 on the second protrusion 22.

The stator 30, which includes a cover 32 and a main portion 38, is adapted to be mounted upon a housing 70. The cover 32 includes a protrusion 34, a radially outwardly directed opening 36 and a shoulder 50. The protrusion 34 is sized and shaped so as to fit within the first groove 16 of the rotor 10, thereby interlocking the rotor 10 with the stator 30. The shoulder 50 is sized and shaped so as to rest upon the housing 70, thereby mounting the stator 30 on the housing 70. The opening 36 is positioned radially outward from the second groove 18 of the rotor 10. Any contaminants which make their way into the seal 200 through the gap between the rotor 10 and the stator 30 must travel through a labyrinthine pathway. Specifically, the contaminants have to move from the first groove 16 over the first protrusion 20 and into the second groove 18. Contaminants reaching the second groove 18 will be flung outwardly by centrifugal force, and will fall by gravity and eventually travel out of the downwardly directed opening 36 of the stator 30.

The stator 30 includes an axially outwardly directed surface 40 opposite the surface 24 of the rotor 10. The stator 30 further includes a radially inwardly directed ridge 48 and a radially inwardly directed flange 44 positioned on either side of a radially inwardly directed groove 46. A radially directed opening 45 leads from the groove 46 into an axially inwardly directed opening 42 which leads back into the housing 70. Any oil entering the groove 46 will drain back, via gravity, through the opening 45 and into the axially directed opening 42, eventually draining back into the housing 70.

The rotor 10 and the stator 30 are formed of a suitable material. Examples of suitable materials include plastic, polytetrafluoroethylene (PTFE) and bronze.

The rotor 10 is divided into two rotor portions 11, 13 and the stator 30 is likewise split into two stator portions 31, 33. The rotor portions 11, 13 mate at an interface 99. The stator portions 31, 33 also mate at an interface 99. As shown in FIG. 3, the interface 99 travels generally along the direction A, which corresponds to an axially directed plane through the rotor 10 and stator 30. Specifically, the interface 99 is contoured so as to travel along and on either side of the plane A in both the stator 30 and the rotor 10. As illustrated, the interface 99 may be generally sinusoidal. Although shown as a sine curve, the interface 99 may take other configurations which allow it to travel to either side of the axial plane A. For example, the interface 99 may have a saw tooth configuration. Alternatively, the interface 99 may be in a straight line closely following or transverse to the axial plane A. The straight line configuration of the interface 99 may be utilized for seals 200 formed of metallic components. If the interface 99 is a straight line, gasket material or sealant will likely be necessary to hinder leakage. The interface 99 may be created either before or after machining of the rotor 10 or the stator 30.

The interface 99 may be made with a contoured steel rule cutter, which cuts without removing any material. Thus, gasket materials are not necessary. However, gasket materials could be required if the cut is made with a blade which removes material. Using a cutter which does not remove material or using gasket materials will also increase the difficulty for fluids or contaminants to leak.

By travelling to both sides of the axial plane A in both the stator 30 and the rotor 10, the interface 99 prevents the stator portions 31, 33 and the rotor portions 11, 13 from becoming axially displaced relative to one another. Specifically, the stator portion 31 is inhibited from being axially displaced from the stator portion 33. Likewise, the rotor 11 is inhibited from being axially displaced from the rotor portion 13. Through this arrangement of the interface 99, in concert with the mounting of the stator 30 on the housing 70 at the shoulder 50, axial movement of the seal 200 along the rotating shaft 60 may be inhibited.

The rotor portions 11, 13 are mechanically connected to one another by cap screws 80 (FIG. 2) placed in orifices 28. Specifically, the rotor portions 11, 13 are placed around the shaft 60 and attached to each other with the screws 80. Especially when the interface 99 is in a straight line, a roll pin 90 (FIG. 6) may be placed in an orifice 26 of the rotor 10 to assist in positioning and fixing the rotor portions 11, 13 together. As the cap screws 80 are tightened, the rotor portions 11, 13 will stretch together becoming tight on the shaft 60 and forming a seal between the two portions 11, 13. While a cap screw 80 is illustrated, the rotor portions 11, 13 may be attached through various other methods such as clips, a garter spring, a hose clamp, a wire clamp or through an interlocking cut of the interface 99.

The stator portions 31, 33 may be located together by the roll pins 90 in the orifices 26 (FIG. 6) and are held securely together by the fit in the housing 70. Specifically, the protrusion 18 of one of the stator portions, for example, portion 31 is interlocked with the groove 16 of the rotor portion 11. Roll pins 90 are inserted into the orifices 26 of the portions 11, 31. The portions 11, 31 are then mounted on, respectively, the shaft 60 and the housing 70. The corresponding portions 13, 33 are likewise interlocked and the other ends of the roll pins 90 are inserted into the orifices 26 of the portions 13, 33 as they are being mounted on the shaft 60 and housing 70. A cap screw 80 is then used to tighten the rotor portions 11, 13 together to affix the rotor 10 to the shaft 60. Through this arrangement, if the screw 80 loosens and the rotor portions 11, 13 lose their interface, the protrusion 18 of the stator 30 will prevent the rotor portions 11, 13 from being released from the rotating shaft 60.

Figure 4:
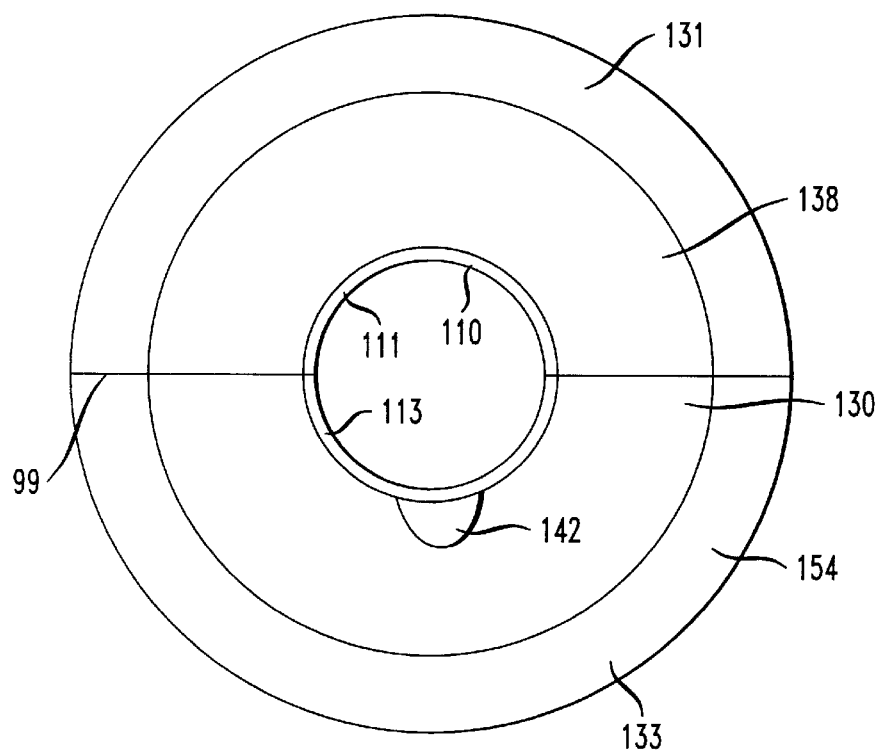
FIG. 4 is a front elevational view of a seal device constructed in accordance with a second preferred embodiment of the present invention.
Figure 5:
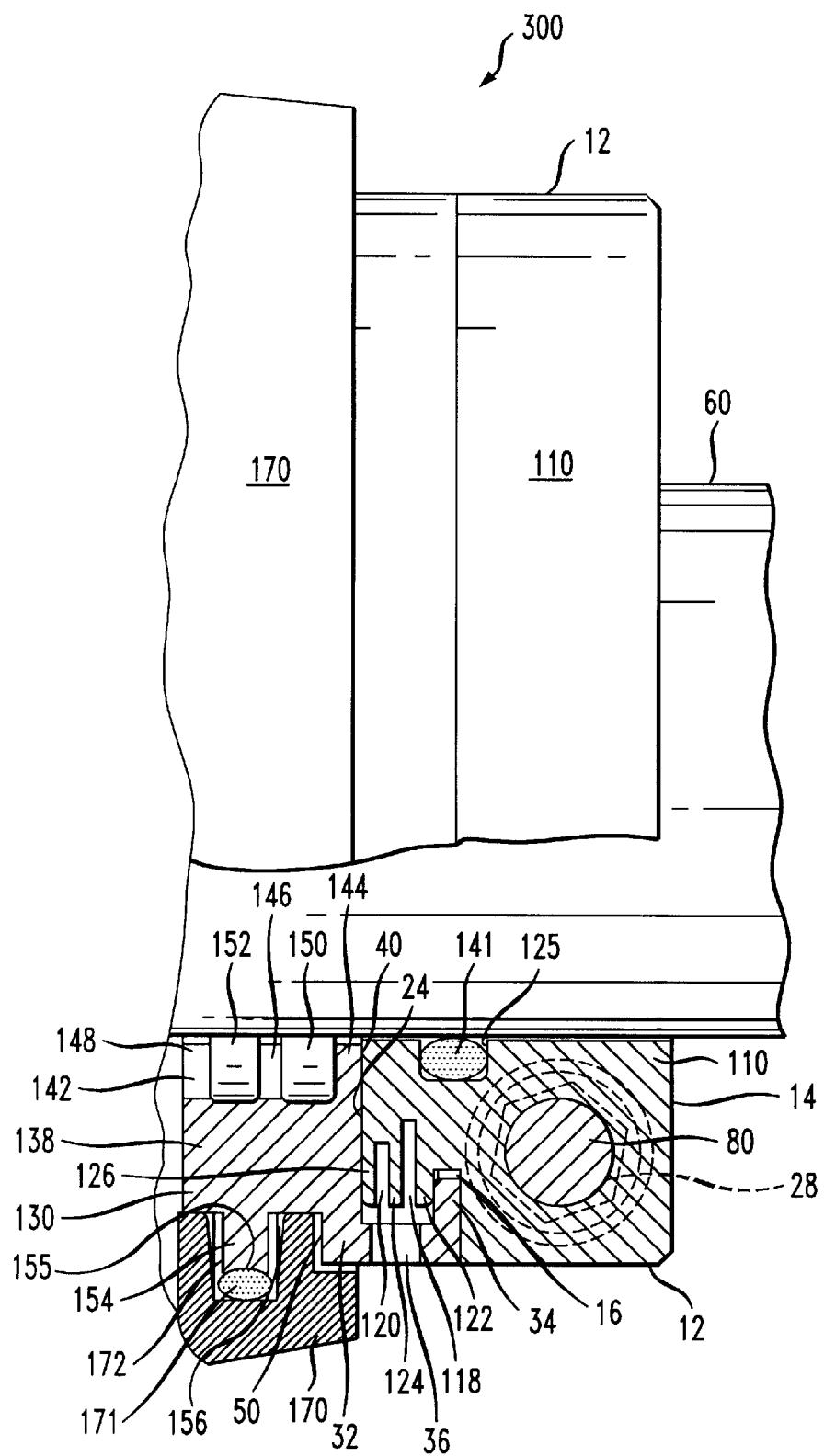
FIG. 5 is a partial cross sectional side view of the seal of FIG. 4.

Referring now to FIGS. 4 and 5, a two-piece labyrinth seal 300 is shown having a rotor 110 and a stator 130. The rotor 110 differs in several respects from the rotor 10 of the first preferred embodiment described above. One significant difference from the rotor 10 is the presence of a radially inwardly directed groove 125 on the rotor 110. The groove 125 is shaped and sized to receive an O-ring 141 to affix the rotor 110 to the rotating shaft 60. Although an O-ring 141 is illustrated, it is to be understood that any similar device capable of affixing the rotor 110 to the rotating shaft 60 is within the scope of the invention described herein. The O-ring 141 is split to make it easier to mount the seal 300 around the rotating shaft 60. As with the first illustrated embodiment, the cap screws 80 and the roll pins 90 may be used to mount the rotor 110 and the stator 130.

The rotor 110 includes first, second and third radially outwardly directed protrusions 122, 124, 126. The rotor 110 further includes first, second and third radially outwardly directed grooves 16, 118, 120. The grooves 16, 118 are on either side of the first protrusion 122. The grooves 118, 120 are on either side of the second protrusion 124. The second and third protrusions 124, 126 are on either side of the third groove 120. The third protrusion 126 includes an axially inwardly directed surface 24.

The stator 130, like the stator 30 described above, includes a main portion 138 and a cover 32. As with the stator 30, the stator 130 includes an inwardly directed protrusion 34 which interlocks in the first groove 16 of the rotor 110. The cover 32 further includes the opening 36 and a shoulder 50.

The stator 130 is adapted to be affixed to and mounted on a block having a split housing 170. The main portion 138 includes a protrusion 154 having a grooved surface 155. The protrusion 154 fits within a groove 172 of the housing 170. The curved portion 155 mounts upon an O-ring 171 positioned in the groove 172. Although described and illustrated as an O-ring 171, other materials may be utilized.

The stator 130 further includes a plurality of ridges 144, 146, 148. Further, the stator 130 includes a pair of radially inwardly directed grooves 150, 152. Specifically, the ridges 144, 146 are on either side of the groove 150, and the protrusions 146, 148 are on either side of the groove 152. The grooves 150, 152 are connected to each other by an axially inwardly directed groove 142. The ridges 144, 146, 148, the radial grooves 150, 152 and the axial groove 142 work together to redirect oil back into the housing 170.

As described above, the O-rings 141, 171 are split for ease of installation of the seal 300. The ends of the O-rings 141, 171 may be reattached upon installation of the seal 300. One method for reattaching the ends is to use a strong adhesive, such as super glue. Another method is to utilize an O-ring having a ball on one end and a socket on the other end and snapping the ends together. Yet another method is to insert a wire with sharp barbs into one end and then into the other end. A further method is to cut the O-ring slightly over on length and then push it into position where it is compressed in place.

Figure 6:
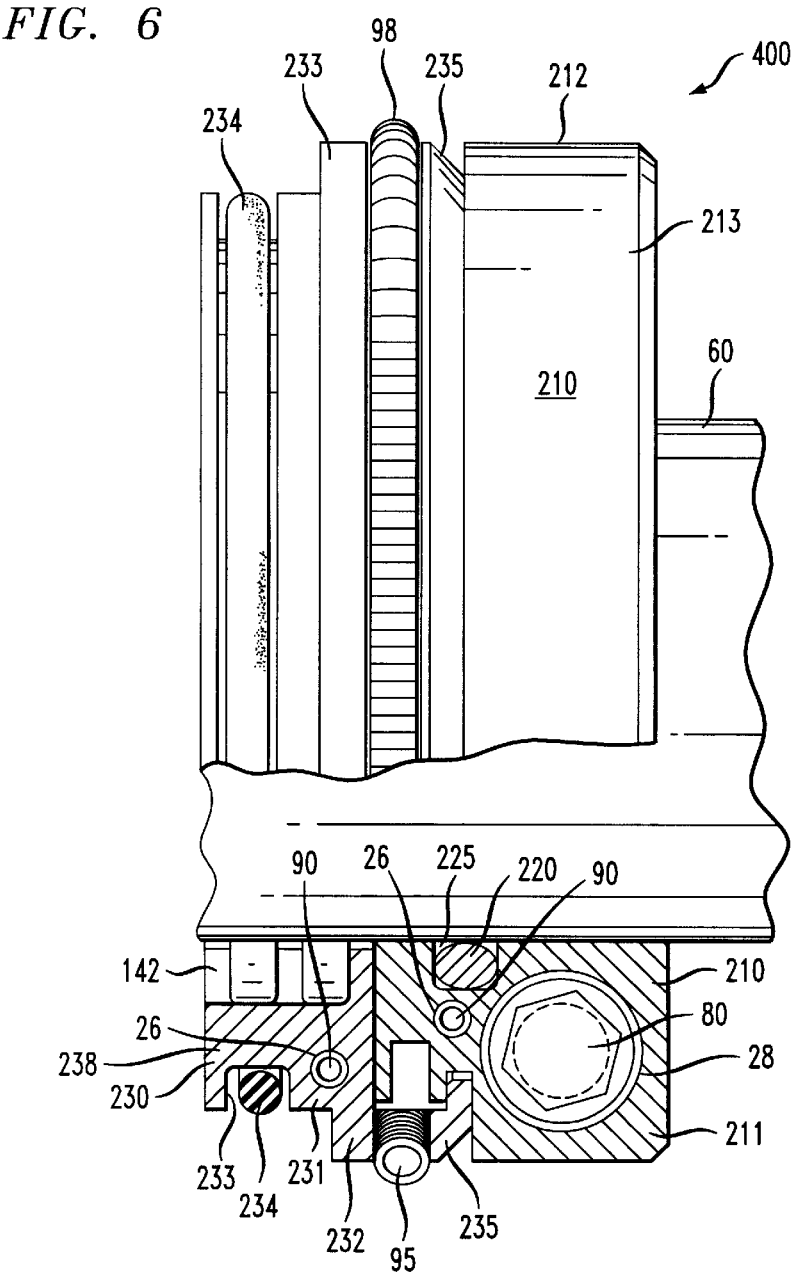
FIG. 6 is a partial cross sectional side view of a seal device constructed in accordance with a third preferred embodiment of the present invention.
Figure 7:
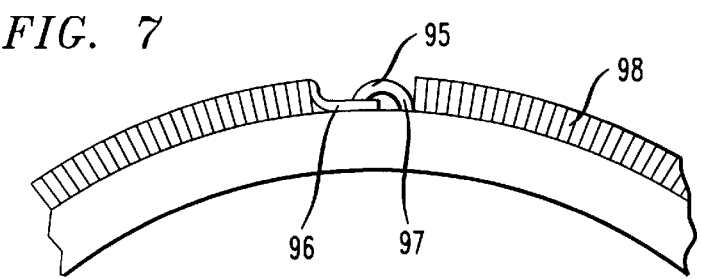
FIG. 7 is a partial front view of the spring of the seal of FIG. 6.

A third preferred embodiment is described in FIGS. 6 and 7. Specifically, a two-piece labyrinth seal 400 is shown having a rotor 210 and a stator 230. The rotor 210 includes a radially inwardly directed groove 225 for housing an O-ring 220, used to affix the rotor 210 to the rotating shaft 260. As described above, the rotor 210 includes the pin orifice 26 for receiving a roll pin 90, which in conjunction with the cap screws 80 in the orifices 28 keeps the rotor portions 211, 213 attached to one another.

The stator 230, like the stators 30, 130, includes a main portion 238 and a cover 232. The stator 230 further includes a radially outwardly directed groove 233 for receiving an O-ring 234. The O-ring 234, or any other like material, is used for mounting and affixing the stator 230 to a housing 70 (not shown in FIG. 6 for clarity). Like the O-ring 220, the O-ring 234 is split for ease of installation of the seal 400. As with the rotor 210, the stator 230 includes a pin orifice 26 for receiving a roll pin 90.

With reference to FIGS. 6–7, a spring 95 is positioned exterior to the cover 232 of the stator 230. The spring 95 includes a spring section 98 with a hook 96 and eye 97 on either end of the spring section 98. The spring 95 may be used to keep the rotor portions 211, 213 and stator portions 231, 233 axially and radially aligned with one another. An inclined surface 235 may be used to assist in placing the spring 95 in its proper position on cover 232.

The above description and drawings are only illustrative of certain preferred versions which achieve the objects, features and advantages of the present invention. It is not intended that the present invention be limited to these versions. For example, although two-piece seals are illustrated and described, the present invention is not to be so limited and can include seals with a different number of pieces. Further, although the seals illustrated and described include cap screws and roll pins to assist in maintaining the integrity of the seal, other like materials may be utilized. In addition, although cap screws and roll pins are described, other suitable forms of mechanical connectors may be used within the scope of the invention.

What is claimed as new and desired to be protected by Letters Patent of the United States is:

1. (Amended) A two-piece labyrinth seal adapted to be mounted upon a rotatable shaft, said seal comprising:
    a stator having at least two stator portions; and
    a rotor axially mounted on and interlocked with said stator, said rotor having at least two rotor portions;
    wherein said rotor portions have a wave-shaped interface which crosses an axially directed plane at least twice to inhibit axial movement of one of said rotor portions relative to the other.

2. The seal of claim 1, wherein said stator portions have an interface to inhibit relative axial movement of said stator portions, said interface of said stator portions crossing said axially directed plane at least twice.

3. The seal of claim 2, wherein said interfaces of said rotor and stator portions have a sinusoidal shape.

4. The seal of claim 1, wherein said stator includes a radially directed opening.

5. The seal of claim 4, wherein said stator includes a radially inwardly directed groove.

6. The seal of claim 5, wherein said stator includes a second radially inwardly directed groove, a plurality of ridges and an axially directed groove, said radially inwardly directed grooves being separated by one of said ridges and said axially directed groove creating a fluid connection between said radially inwardly directed grooves.

7. The seal of claim 5, wherein said stator includes a flange adjacent said radially inwardly directed groove.

8. The seal of claim 7, wherein said stator includes an axially directed groove.

9. The seal of claim 8, wherein said stator includes an opening between said grooves.

10. The seal of claim 9, wherein said stator includes a cover having a shoulder for positioning the seal with respect to a housing.

11. The seal of claim 10, wherein said stator includes a protrusion and said rotor includes a plurality of grooves, said protrusion being interlocked in one of said plurality of rotor grooves.

12. The seal of claim 1, wherein said rotor portions are mechanically connected together.

13. The seal of claim 12, wherein said rotor portions are connected together by at least one cap screw.

14. The seal of claim 1, further including a spring surrounding said stator.

15. The seal of claim 14, wherein said spring includes a hook and eye structure for securing said spring to said stator.

16. The seal of claim 1, wherein said stator portions have an interface to inhibit relative axial movement of said stator portions, said rotor and said stator are formed of a metal, said interfaces of said rotor portions and said stator portions are in a single plane, and further including a sealant material for sealing said interfaces.

17. A sealed systems, comprising
 a housing;
 a shaft rotatable relative to an extending through said housing; and
 a labyrinth seal including:
  a stator having at least two stator portions, said stator being located in said housing; and
  a rotor axially mounted on and interlocked with said stator, said rotor having at least two rotor portions, said rotor being located on said shaft;
 wherein said rotor portions have a wave-shaped interface which crosses an axially directed plane at least twice to inhibit axial movement of one of said rotor portions relative to the other.

18. The system of claim 17, wherein said stator portions have an interface to inhibit relative axial movement of said stator portions, said interface of said stator portions crossing said axially directed plane at least twice.

19. The system of claim 18, wherein said stator includes a cover having a shoulder, wherein said shoulder contacts said housing.

20. The system of claim 19, wherein said stator includes a protrusion and said rotor includes a plurality of grooves, said protrusion being interlocked in one of said plurality of rotor grooves.

21. The system of claim 17, wherein said stator includes a radially directed opening.

22. The system of claim 21, wherein said stator includes a radially inwardly directed groove, and wherein said stator includes a second radially inwardly directed groove, a pair of ridges and an axially directed groove, said radially inwardly directed grooves being separated by one of said ridges and said axially directed groove creating a fluid connection between said radially inwardly directed grooves.

23. The system of claim 17, wherein said rotor portions are mechanically connected to one another.

24. The system of claim 17, further including a spring surrounding an outer diameter of said stator.

25. The system of claim 17, wherein said stator portions have an interface to inhibit relative axial movement of said stator portions, said rotor and said stator are formed of a metal, said interfaces of said rotor portions and said stator portions are in a single plane, and further including a sealant material for sealing said interfaces.

26. A method of forming a labyrinth seal on a shaft, said method comprising the steps of:
 mating at least two rotor portions to form a rotor, wherein said rotor portions mate at a wave-shaped interface which crosses an axially directed plane at least twice to inhibit axial movement of one of said rotor portions relative to the other;
 mating at least two stator portions to form a stator;
 locating said rotor on said shaft; and
 interlocking said rotor and said stator.

27. The method of claim 26, wherein said steps of mating and interlocking include the substeps of:
 interlocking one of said rotor portions with one of said stator portions;
 then mounting said interlocked rotor and stator portions on said shaft;
 then interlocking another of said rotor portions with another of said stator portions; and
 then mounting said another interlocked rotor and stator portions on said shaft.

28. The method of claim 26, wherein said stator portions mate at an interface to inhibit relative axial movement of said stator portions, said interface of said stator portions crossing said axially directed plane at least twice.

29. The method of claim 28, wherein said rotor portions are connected together by at least one cap screw.

30. The method of claim 28, further including the step of mechanically connecting said stator portions together.

31. The method of claim 30, wherein said stator portions are connected together by a roll pin.

32. The method of claim 26, further including the step of mechanically connecting said rotor portions together.

33. A method of forming a labyrinth seal on a shaft, said method comprising the steps of:
 interlocking a first rotor portion with a first stator portion;
 mounting said first interlocked rotor and stator portions on said shaft;
 interlocking a second rotor portion with a second stator portion;
 mounting said second interlocked rotor and stator portions on said shaft;
 mating said first and second rotor portions to form a rotor, wherein said first and second rotor portions mate at an interface which crosses an axially directed plane at least twice to inhibit relative axial movement of said first and second rotor portions;
 mating said first and second stator portions to form a stator, wherein said first and second stator portions mate at an interface which crosses an axially directed plane at least twice to inhibit relative axial movement of said first and second stator portions;
 mechanically connecting said rotor portions together by at least one cap screw.

* * * * *